United States Patent [19]
Onodera

[11] Patent Number: 5,452,588
[45] Date of Patent: Sep. 26, 1995

[54] FREEZER APPARATUS HAVING MULTIPLE PRESSURE ROOMS TO PROVIDE CONTROLLED BLAST PRESSURE FOR RAPID FREEZING OF PRODUCTS

[75] Inventor: Hirofumi Onodera, Yamabe, Japan

[73] Assignee: Fujitetsumo Co., Ltd., Nara, Japan

[21] Appl. No.: 213,015

[22] Filed: Mar. 15, 1994

Related U.S. Application Data

[63] Continuation-in-part of Ser. No. 17,263, Feb. 12, 1993, abandoned.

[51] Int. Cl.⁶ .............................. F25D 25/02; F25D 25/04; F25D 13/06
[52] U.S. Cl. .................................... 62/381; 62/63; 62/380
[58] Field of Search ................................ 62/63, 381, 380

[56] References Cited

U.S. PATENT DOCUMENTS

| | | | |
|---|---|---|---|
| 2,153,742 | 4/1939 | Conn | 62/63 |
| 2,419,380 | 4/1947 | Van Etten | 62/380 |
| 3,115,756 | 12/1963 | Overbye | 62/380 X |
| 3,267,585 | 8/1966 | Futer | 62/380 X |
| 3,315,492 | 4/1967 | Dreksler | 62/381 |
| 3,884,213 | 5/1975 | Smith | 99/473 X |
| 4,177,647 | 12/1979 | Overbye | 62/381 X |
| 4,204,006 | 5/1980 | Emgard et al. | 62/380 |
| 4,338,911 | 7/1982 | Smith | 99/473 X |
| 4,474,498 | 10/1984 | Smith | 99/443 C X |
| 4,479,776 | 10/1984 | Smith | 99/443 C X |
| 4,679,542 | 7/1987 | Smith et al. | 34/155 X |
| 4,726,124 | 2/1988 | Freiberg | 34/155 X |
| 5,203,820 | 4/1993 | Dibbs | 62/381 |
| 5,205,135 | 4/1993 | Lang | 62/381 |
| 5,214,934 | 6/1993 | Palframan et al. | 62/381 |

FOREIGN PATENT DOCUMENTS

| | | | |
|---|---|---|---|
| 8908808 | 9/1989 | WIPO | 62/381 |

*Primary Examiner*—Christopher Kilner
*Attorney, Agent, or Firm*—Jacobson, Price, Holman & Stern

[57] ABSTRACT

A freezer apparatus for rapidly freezing products, such as food products, by blasting cold air at a uniform or controlled temperature and volume along the length of a conveyor which carries the products. In one embodiment, the freezer apparatus comprises a single cooling unit which feeds cold air to multiple blast nozzles disposed at predetermined angular positions around a spirally wound conveyor and at each level of the conveyor. In another embodiment, two cooling units are provided, each associated with a group of blast nozzles disposed above and below a linear conveyor.

16 Claims, 6 Drawing Sheets

FIG. 4
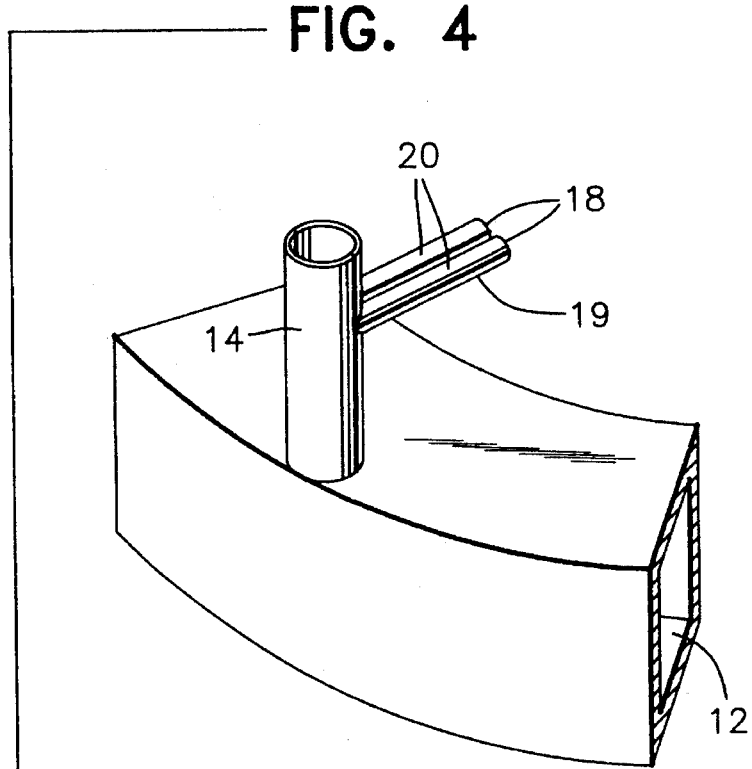
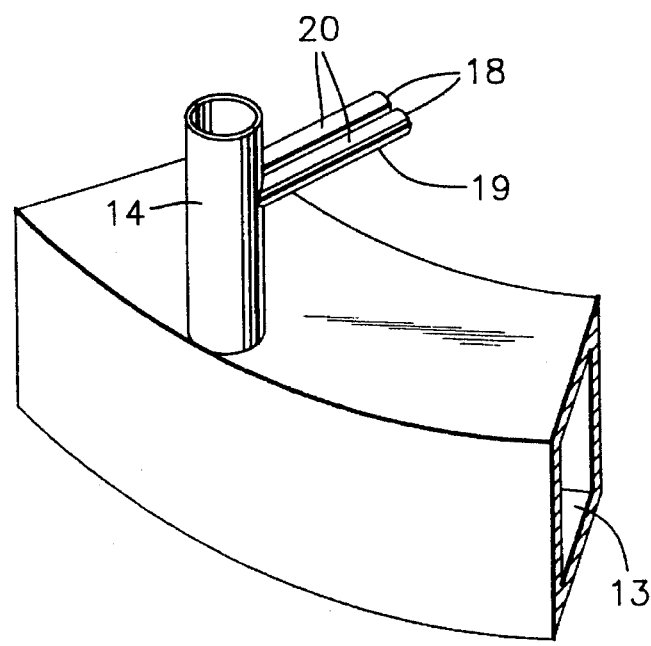

FREEZER APPARATUS HAVING MULTIPLE PRESSURE ROOMS TO PROVIDE CONTROLLED BLAST PRESSURE FOR RAPID FREEZING OF PRODUCTS

CROSS-REFERENCE APPLICATION

This application is a continuation-in-part of U.S. patent application Ser. No. 08/017,263 filed Feb. 12, 1993 abandoned.

BACKGROUND OF THE INVENTION

The present invention relates to a freezer apparatus capable of rapid and controlled freezing of products, such as food products, and a method of doing the same.

In the field of food product freezing, the speed at which the product is frozen and the distribution of cold air about the product are critical factors in determining the quality of the frozen product. If a product is frozen too slowly, unwanted ice crystals form, destroying the desirable natural qualities of the product.

SUMMARY OF THE INVENTION

The freezing process physically, microbiologically and chemically changes all food products. The quality of a frozen food product is affected by the physical and chemical changes. In addition, the rate of physical change or freezing time duration determines the size of ice crystals produced on the product. Depending on the product, this greatly affects retention of juices in and the texture and flavor of the product.

In accordance with the present invention, a freezer apparatus is provided which is designed to provide a controlled distribution of cold air blasts throughout the apparatus, and a controlled distribution of air blasts to the products themselves. The main thrust of the present invention is to rapidly freeze products with uniform temperature and volume air blasts. Uniform-quick freezing is effective for most food products. However, it is recognized that there are certain products which are best frozen with non-uniform air blasts, and the present invention envisions this capability. Specifically, the apparatus is optionally designed to generate colder air blasts in a first portion of the apparatus than in other portions of the apparatus, as will become more clear hereinafter. Moreover, the apparatus according to the present invention is designed to generate ranges of temperature and volumes of air blasts found to be most suitable for freezing particular products.

This invention is equally applicable to various types of conveyor, such as the spiral conveyor and the linear conveyor, the nature and mechanisms for each being well known in the art. Two embodiments of the present invention include such various types of conveyors, such as the spiral and linear conveyor.

In a first embodiment, the present invention is a freezer apparatus having a spiral conveyor, and in a second embodiment, the present invention is a freezer having a linear conveyor. In both embodiments, the freezer apparatus rapidly freezes the product in such a way (uniformly or non-uniformly) so as to preserve the products's natural characteristics.

In the first embodiment, the freezer apparatus comprises a spiral conveyor which carries the products through a heat insulated casing. The freezer apparatus preferably includes a single cooling unit which feeds cold air to multiple blast nozzles disposed at predetermined angular positions around the conveyor and at each level of the conveyor. The blast nozzles are grouped into upper and lower zones about the spiral conveyor.

The cold air from the cooling unit is drawn out by two fans. One fan draws cold air from the cooling unit and supplies the cold air to an upper pressure room which is connected via an upper length portion of multiple feed conduits to the nozzles in the upper zone. The other fan draws cold air from the cooling unit and supplies the cold air to a lower pressure room which is connected via a lower length portion of multiple feed conduits to the nozzles in the lower zone. The feed conduits form an enclosure around the spiral conveyor, and serve as a baffle to contain the cold air around the conveyor, and thus in contact with the products being conveyed.

The two fans have substantially equal output capacities. The two pressure rooms allow for a more even distribution of cold air to the nozzles so that air blasted from upper and lower slits of the nozzles is substantially uniform in temperature, volume and pressure which together define the cooling capacity of the air blasts along the length of the conveyor, and thus throughout the freezing process. As a result, the products are subjected to freezing air blasts which are uniform throughout the apparatus and are sufficient to freeze the goods rapidly.

By providing intense and uniform blasts of cold air along the entire length of the conveyor, the products are frozen rapidly, thus maintaining their natural qualities when frozen.

The freezer apparatus according to the first embodiment is optionally designed and constructed so that the air blasts are non-uniform in the apparatus. For example, certain products are better frozen if subjected to air blasts in a first stage which are colder than air blasts in a second stage. In the terminology of the art, the products are "crusted" rapidly in the first stage, to minimize product weight loss and minimize loss of natural juices, as well as aromatic and flavor essences. This serves to lock in the qualities that are critical to the marketability of the product. The second stage is not as cold as the first, and serves to complete the freezing process.

The freezer apparatus according to the second embodiment comprises a linear conveyor and two cooling units. A fan is associated with each cooling unit and a respective pressure room. Blast nozzles are positioned above and below the conveyor, offset from each other. One pressure room supplies cold air to the blast nozzles which are above the conveyor, and the other pressure room supplies cold air to the blast nozzles which are below the conveyor. As a result, the temperature and pressure of the blasted air from the nozzles above and below the conveyor is substantially uniform. Alternatively, a controlled or non-uniform distribution of cold air is achieved by controlling the cooling capacity of the cooling units or building a particular pressure room to have a greater size than another pressure room. This makes the cooling capacity of the blasts on one side of the conveyor greater than the cooling capacity of air blasts on the other side of the conveyor, as is desired for certain products.

It is, therefore, a primary object of the invention to provide an apparatus and process for rapidly freezing products.

It is a further object of the present invention to maintain the natural quality of food products when frozen by rapidly freezing the products.

It is still another object of the present invention to provide an apparatus capable of optimally freezing food products by subjecting the products to blasts of cold air of uniform or non-uniform cooling capacities throughout the freezing process.

The above and other objects and advantages of the present invention will become more readily apparent when reference is made to the following description taken in conjunction with the accompanying drawings.

DESCRIPTION OF THE DRAWINGS

FIG. 4 is a partial isolated perspective view illustrating the upper and lower air pressure room and associated feed conduit and blast nozzles of the freezer apparatus according to the first embodiment.

DETAILED DESCRIPTION OF THE DRAWINGS

Figure 1:
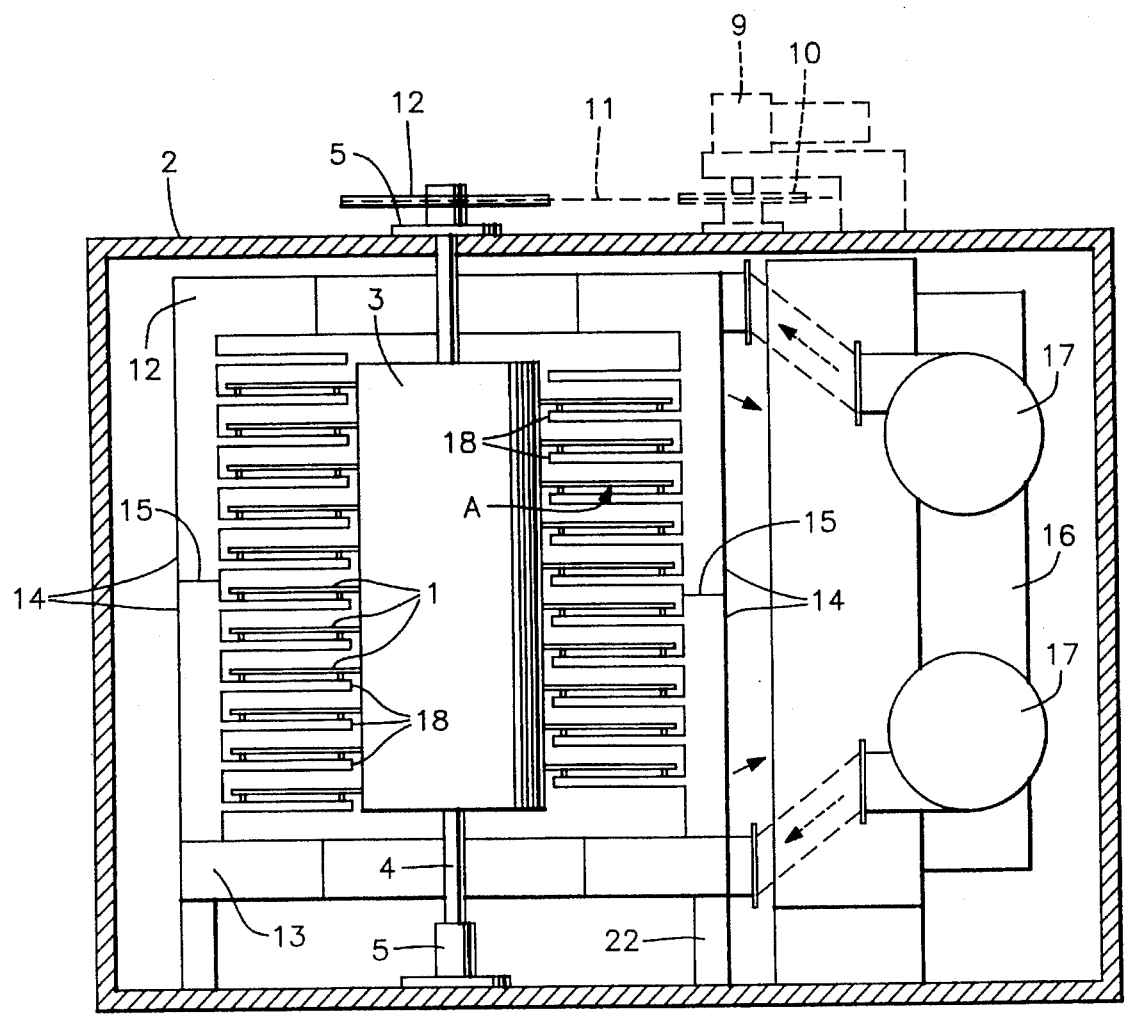
FIG. 1 is a side view of the freezer apparatus according to the first embodiment of the present invention.
Figure 2:
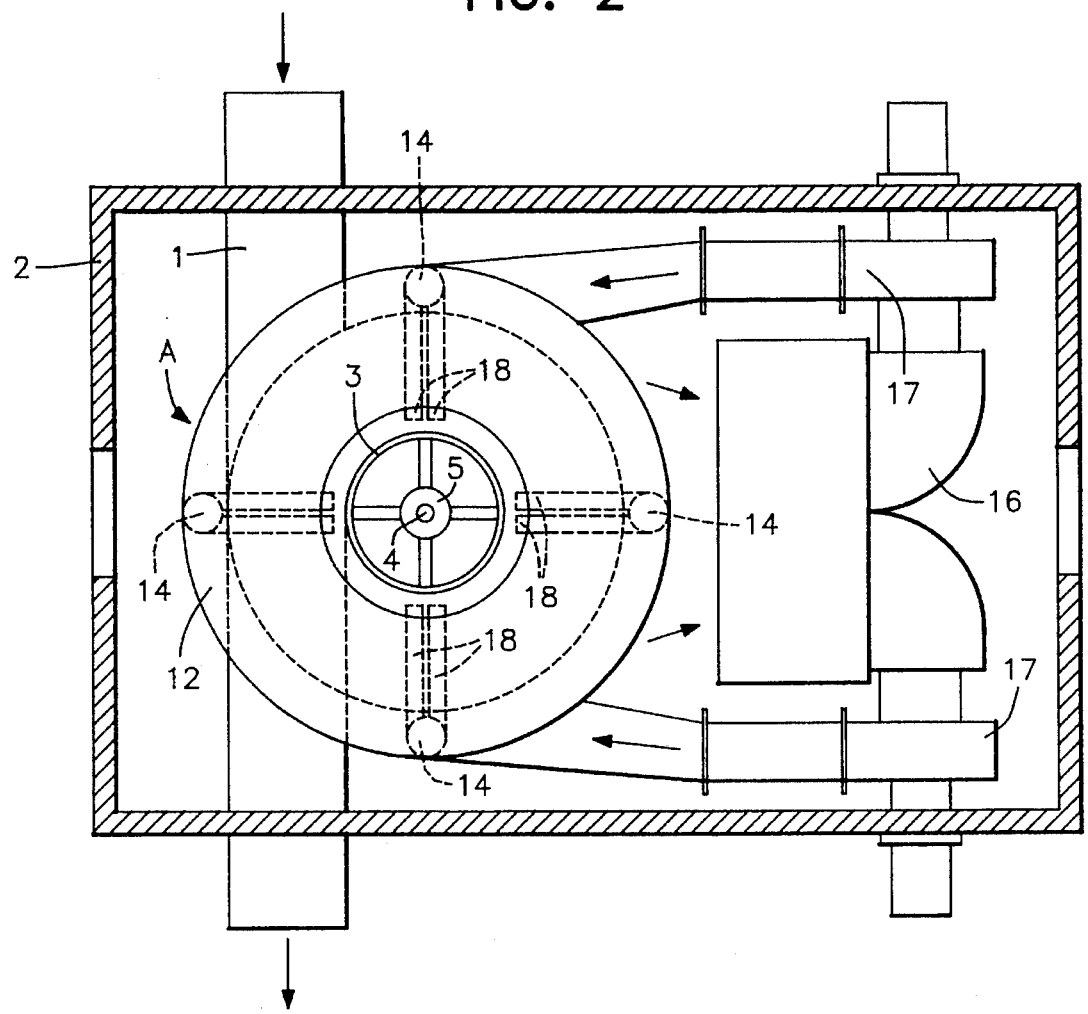
FIG. 2 is a top view of the freezer apparatus according to the first embodiment of the present invention.
Figure 3:
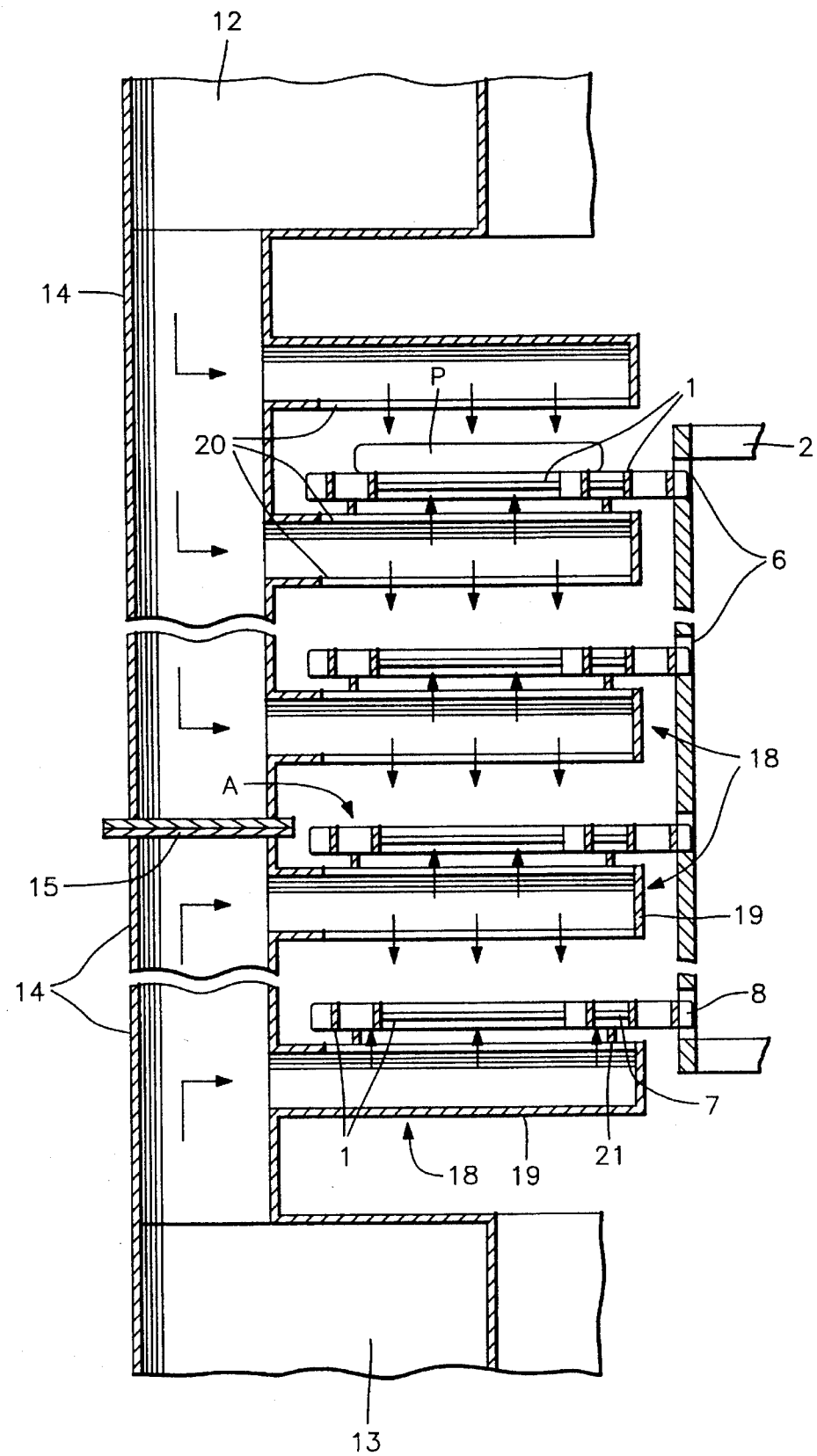
FIG. 3 is an internal partial cross-sectional view of the freezer apparatus of the first embodiment and illustrating the layers of the spiral conveyor and associated blast nozzles.

Referring first to FIGS. 1–3, the freezer apparatus according to the first embodiment of the present invention comprises a heat insulated casing 2 which encloses a rotary drum 3. The rotary drum 3 is mounted in the casing to rotate about vertically oriented shaft 4 between bearings 5. A motor 9 drives the rotary drum 3 through the gears 10 and 19 and drive belt or chain 11. A conveyor A is spirally wound about the rotary drum 3 to rotate therewith, and supports a belt 1 which carries products to be frozen through the apparatus from an entry point to an exit point shown in FIG. 2. An inner edge 8 of the conveyor A is mounted in slots 6 on the outer surface of the drum, and the conveyor is maintained rigid with respect to the drum by a link member 7.

A similar spiral conveyor device is disclosed in U.S. Pat. No. 4,367,596, issued to the same inventor as the present application, though that patent is directed to a drying apparatus in which the articles to be conveyed are uniformly exposed to a hot blast or a cold air blast. The written description and drawings in U.S. Pat. No. 4,367,596 are herein incorporated by reference.

The conveyor A extends outward in the annular region about the drum 3, and exposes the top and bottom surfaces of the belt 1 in zones where cold air is blown. Specifically, the region outside the annular region is divided into upper and lower zones which are supplied with cold air from an upper pressure room 12 and a lower pressure room 13, respectively. Specifically, four feed conduits 14 connect each pressure room to their respective zone. A horizontal dividing wall 15 (FIGS. 1 and 3) in the feed conduits 14 separates the feed conduits 14 into an upper length portion and a lower length portion, which are connected to the upper and lower pressure rooms 12 and 13, respectively. The apparatus is optionally provided with more or less than four feed conduits.

As shown in FIGS. 1 and 2, the feed conduits 14 form a baffle-like structure that encloses an annular region around the drum 3 to contain the cold air blasts around the conveyed products. This baffle-like structure contributes to the efficiency of the freezer, and also assists in maintaining the air temperature uniform throughout the apparatus.

Cold air is supplied to each pressure room from a cold air source or cooling unit 16. Two fans 17 are provided, each of which blows cold air to one of the respective pressure rooms 12 and 13. One of the fans 17 is connected by a duct 30 to the lower pressure room 13 and the other of the fans 17 is connected by duct 32 to the upper pressure room 12.

With reference to FIGS. 3, 4A and 4B, the pressure rooms 12 and 13 supply cold air under pressure to feed conduits 14. The pressure rooms 12 and 13 are annular in shape as shown in FIGS. 4A and 4B. There are four feed conduits 14 as shown in FIG. 2, positioned at 90° from each other about the drum 3, and each divided into the upper and lower portions by the dividing wall 15. Each feed conduit 14 has attached thereto vertically spaced blast nozzles 18. The blast nozzles 18 are spaced so that the products P to be frozen (FIG. 3) have sufficient clearance to travel.

Only one blast nozzle member is shown in each of FIGS. 4A and 4B for simplicity. The blast nozzle members 18 comprise elongated tubular members which have slits 20 facing upwards and downwards, though only the upwards facing slits are shown. Friction-free sliding members 21 are disposed between the blast nozzle members 18 and the conveyor A to enable the conveyor to slide over the blast nozzle members 18.

The pressure room 12 supplies the blast nozzle members 18 in the upper half annular zone with cold air via the upper length portions of feed conduits 14. Pressure room 13 supplies cold air to blast nozzle members in the lower half annular zone with cold air via the lower length portions of feed conduits 14. The fans 17 have substantially equal output capacities and are connected in the system through similar dimensioned duct work (feed conduits 14) at substantially equal distances from the cold air source 16 and blast nozzles members 18. As a result, the temperature and volume of the cold air blasted onto the products P carried by the belt 1 is substantially equal at corresponding blast nozzles above and below each convolution of the belt 1, and uniform throughout the apparatus.

The cold air delivered by the blast nozzles onto the products P is under extremely high pressure. In particular, the temperature of the cold air is approximately −20° C. to −40° or colder, depending on the product, and is transmitted through the nozzles at a rate of 15 m/sec to 50 m/sec, depending on the product.

Moreover, the volume rate of air blown out of the blast nozzle slits is also a factor in determining the freeze time of a product. Nozzles with larger slit dimensions blast higher volumes of air, and the pitch of the slits on the nozzle is a factor in air blast volumes. Distance between the nozzles and the conveyed products is also a factor in determining freeze time, by affecting product exposure to cold air blasts. Finally, the nozzles are optionally oriented in certain orientations, such as directly opposite each other above and below the conveyor, offset from each other above and below the conveyor, etc. The orientation of the nozzles controls (smaller or larger) the contact volume of cold air blast that is capable of, and suitable for, penetrating the surface of the products P to freeze the goods. The cold air which is blown by the blast nozzles is recycled back to the cooling unit 16 as shown by the right-hand pointing arrows in FIGS. 1 and 2.

By creating the above specified cold air blasts at each blast nozzle member, uniformly at each blast nozzle throughout the apparatus, the products are rapidly frozen. For example, with the air blast at the nozzle members at −35° C., and 15 m/sec, the average freezing time for a 4 oz hamburger patty product is approximately 10 minutes. Of course, it should be understood that the average freezing time depends on the mass of the product and the content of the product.

The cold air blasted onto the products "penetrates" the products to freeze the products by conduction. That is, the cold air freezes by contacting the outermost layer of the goods, which in turn draws heat from the inner portions, freezing the inner portions, and ultimately freezing the product through-and-through.

It is also advantageous that the cold air blown downward from a nozzle is substantially equal to that blown upwards from the nozzle just below it, so that the products are not blown off of the conveyor.

The two pressure rooms, one feeding cold air to the upper half of the blast nozzles, the other feeding cold air to the lower half of the blast nozzles, and equal capacity fans positioned substantially equidistant from the blast nozzles, contribute to achieve the uniform temperature and volume of cold air blasted through the upper and lower slits of each nozzle. The same uniform cold air blasts is achieved even if the distances between pressure room are not equal. Specifically, higher capacity fans are used to compensate for the greater distance that the air is required to travel between the pressure room and corresponding blast nozzle members. In addition, the distances and dimensions of the various feed conduits are optionally modified to achieve the necessary balance needed to provide substantial uniform temperature and volume at the output of the blast nozzle members.

While it is important for many food products to be frozen uniformly, some products are better frozen non-uniformly. A non-uniform freezing process is preferable for certain products, such as products that are frozen in their containers. Non-uniformity, also referred to as "controlled" distribution, is with respect to stages of freezing, and also with respect to the temperature distribution of air delivered to the product itself.

For example, fish and poultry products, and fish in particular, have a high water content (about 70%). Therefore, to prevent loss of moisture, these products are best frozen by first "flash-freezing" at a suitable temperature for a period of time, such as 10 seconds. Then, the product would continue to be frozen at a less colder temperature for the remainder of the freezing process. Referring to the apparatus shown in FIG. 1, the lower half of the apparatus is subjected to colder air blasts than the upper half. This is achieved by increasing the output of the fan associated with the pressure room and blast nozzles in the lower half, thus increasing the pressure at the blast nozzles in the lower half, which increases the cooling capacity of the blasted air. Other ways to alter the balance include changes the size of the pressure room feeding the blast nozzles. For example, the apparatus is optionally built with a smaller pressure room dedicated for a particular group of blast nozzles at which higher air blast pressure is desired.

To control the temperature distribution of air with respect to the product itself, the cooling capacity of air blasted from the slits below the conveyor could be made greater than that of the slits above the conveyor. For example, the width of the upward facing slits is made smaller which increases the pressure and thus increases the cooling capacity of blasted air. Consequently, as products travel through the apparatus, they are subjected to colder air blasts from below than from above. The bottom portion of the product thereby freezes quicker than the top portion, as the occasion may desire.

Figure 5:
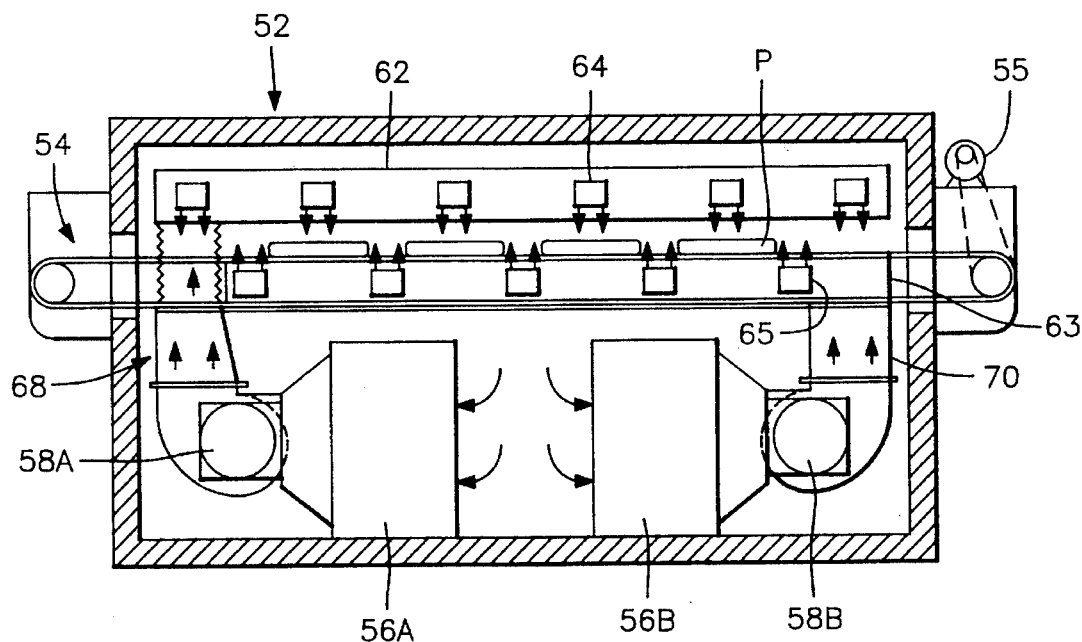
FIG. 5 is an internal side view of a linear conveyor freezer apparatus according to the second embodiment of the present invention.
Figure 6:
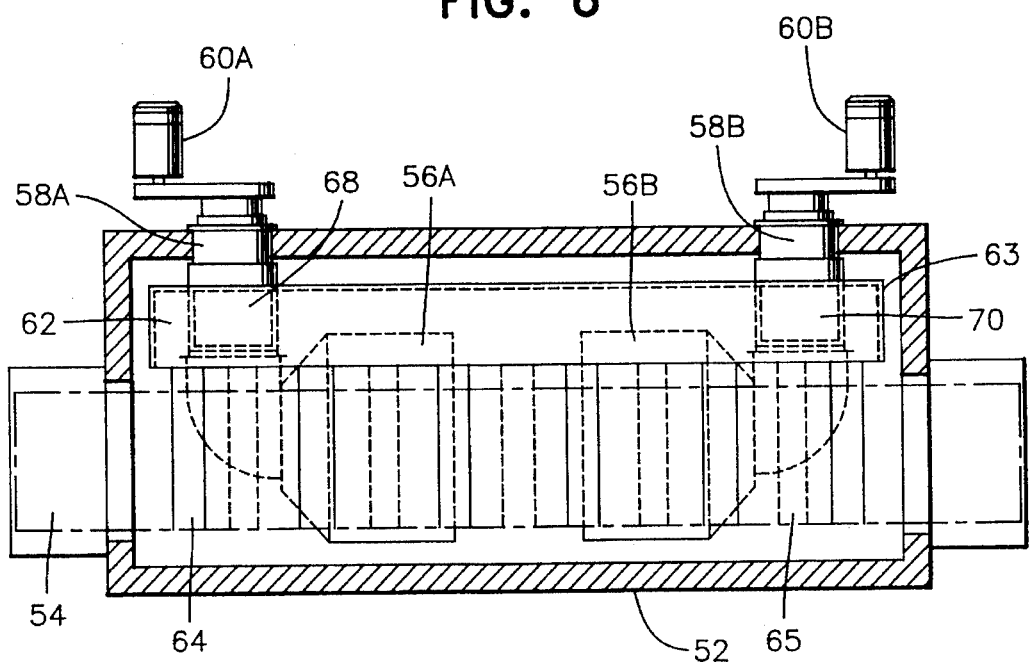
FIG. 6 is an internal top view of the freezer apparatus according to the second embodiment.

Referring to FIGS. 5 and 6, the freezer apparatus according to the second embodiment includes heat insulated casing 52, a conveyor belt 54, two cooling units 56A and 56B, two fans 58A and 58B and two motors 60A and 60B, to drive the fans 58A and 58B, respectively. A pressure room 62 is provided which is connected to several blast nozzles 64 positioned above the conveyor. A pressure room 63 is provided which is connected to several blast nozzles 65 positioned below the conveyor belt.

The fans 58A and 58B are attached to pressure rooms 62 and 63, respectively, via ducts 68 and 70, respectively. Cold air is drawn out of the cooling units 56A and 56B by the fans 58A and 58B and blown into the pressure rooms 62 and 63, respectively. The pressure rooms 62 and 63 collect the cold air, whereupon the pressure of the air in the pressure rooms 62 and 63 increases, before the air passes to the blast nozzles. The pressure in the pressure rooms 62 and 63 varies depending on the output capacity of the fans 58A and 58B, the cooling capacity of the cooling units 56A and 56B, and pressure room design. Nevertheless, the purpose of the pressure rooms is to collect cold air prior to being blasted out of the blast nozzles.

All of the components of the apparatus are inside the casing 52 except for the motors 60A and 60B, and their associated fan drive belts 55.

Figure 7:
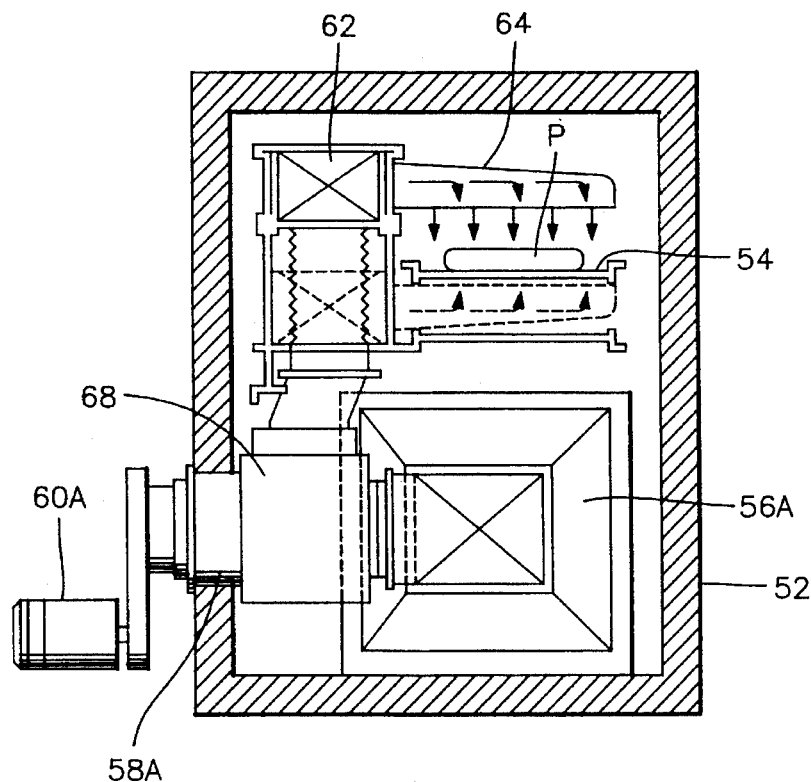
FIG. 7 is an internal end view illustrating the blast nozzles above the conveyor.
Figure 8:
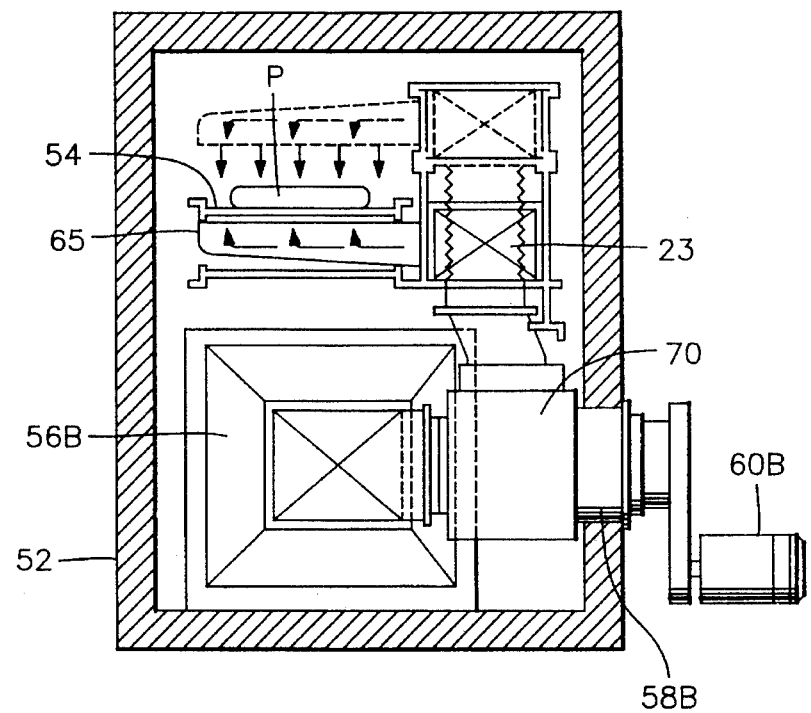
FIG. 8 is an internal end view illustrating the blast nozzles below the conveyor.

As shown in FIGS. 7 and 8, the blast nozzles 64 and 65 are connected to pressure rooms 62 and 63, respectively, and extend outward over and under the conveyor belt 54. The blast nozzles 64 and 65 are hollow members having slits on one surface. The nozzles 64 are positioned above the conveyor belt to blow cold air downward onto the conveyor. The nozzles 65 are positioned below the conveyor to blow cold air upwards onto the conveyor belt 54.

In operation, the conveyor belt 54 carries on an upper surface products P which are to be frozen. Cold air is drawn from the cooling units 56A and 56B by the fans 58A and 58B and blown into the pressure rooms 62 and 63. The cold air increases in pressure in the respective pressure room and is gradually conveyed via ducts 68 and 70 into the blast nozzles 64 and 65. The slits of the nozzles 64 blast the cold air downward onto the top surface of the products P and the slits of nozzles 65 blast cold air upward to the bottom surface of the products. The cold air which is blasted from the slits of the nozzles 64 and 65 is substantially equal in pressure and is at a sufficient velocity (15 m/sec to 50 m/sec, depending on the product) to freeze the products as they pass through the apparatus. As a result, the products cannot be set afloat or blown off of the conveyor.

The cold air blasted downward and upward from the blast nozzles 64 and 65, respectively, is collected in the cooling units 56A and 56B where it is further cooled to a desired temperature and again collected by the fans 58A and 58B. The air in the freezer is as cold as −45° F. The velocity of the air blasted out of the nozzles 64 and 65 is approximately 25 m/sec but is in the range of 10 m/sec to 35 m/sec. The apparatus is constructed to accommodate a particular range of air velocity and air temperature depending on the type of product to be frozen. The apparatus is optionally constructed to have a cooling unit with adjustable output and fans with adjustable fan speeds to adjust air velocity and temperature for various products.

Like the freezer apparatus of the first embodiment, the linear conveyor freezer apparatus provides uniform blasts of cold air, as well as controlled or non-uniform blasts. Specifically, because the blast nozzles 64 and 65 are supplied with air from dedicated cooling units and fans, the upper blast nozzles 64 blasts colder air than the lower blast nozzles 65, or vice versa. There are several ways to achieve this non-uniformity.

First, if the cooling unit 56A is an adjustable type, it is adjusted to increase its capacity, or a higher capacity unit is installed at assembly-time of the apparatus. Alternatively, or in addition, the apparatus is built to have different size pressure rooms for providing desired pressures at the respective blast nozzles. Also, the size of the slits of the blast nozzles is optionally made different above and below the conveyor. The cooling capacity of air above the conveyor is thereby made different than air below the conveyor, as is useful for certain products.

To create a multi-stage freezing apparatus, blast nozzles at one end of the apparatus could have slits which are smaller than at the other end, making the pressure at the blast nozzles, both above and below the conveyor, greater at one end than the other.

When building a freezer apparatus according to the present invention, the apparatus is constructed to generate air blasts (uniform or non-uniform) with the necessary cooling capacity depending on the type of product(s) to be frozen. A particular freezer apparatus is designed to provide the necessary air blast pressures and temperatures to optimally freeze that product. Furthermore, a freezer apparatus is designed to optimally freeze several types of products, and is capable of providing colder air blasts for the more demanding products, and also be adjustable by the user (such as fan output, cooling unit output capacity, etc.) to provide weaker air blasts for the less demanding products.

Moreover, depending on the type of product, ideal air blasts temperatures and pressures are determined for those products. An overall heat loss calculation is made depending on the size of the apparatus for the particular product, and an appropriate capacity cooling unit is chosen to provide the necessary tons of cooling capacity to achieve the desired air blast temperature. Heat loss of the various duct work in the apparatus is considered in the overall heat loss calculation.

The above description is intended by way of example only and is not intended to limit the present invention in any way except as set forth in the following claims.

What is claimed is:

1. A freezer apparatus comprising:

heat insulating casing means;

belt means for supporting and carrying through said casing means products which are to be frozen;

means for spirally conveying the belt means through vertically spaced convolutions inside said casing means about an axis between an entry to said casing means and an exit from said casing means;

a plurality of conduit means extending substantially parallel to said axis and arranged at spaced angular positions about the axis, each of said conduit means being partitioned into a lower length portion and an upper length portion, said lower length portion and said upper length portion being sealed from each other;

cold air source means disposed in said casing means;

first and second fan means each having an input and an output, the input of each fan means attached to said cold air source means to draw cold air from the cold air source means and blow cold air through its output;

upper and lower air pressure rooms, said upper air pressure room connected to the output of the first fan means, and said lower air pressure room connected to the output of the second fan means, said upper air pressure room further connected to the upper length portion of each of the plurality of conduit means, and said lower air pressure room further connected to the lower length portion of each of the plurality of conduit means;

a plurality of blast nozzles members connected to each of the plurality of conduit means along the lengths thereof, the blast nozzles members positioned in between contiguous convolutions of the belt means for blasting cold air from above and below at substantially equal temperature and volume at the belt means and uniformly along the length of the belt means.

2. The apparatus of claim 1, wherein the plurality of conduit means and air blast nozzles are positioned at 90° about the axis.

3. The apparatus of claim 1, wherein said blast nozzle members comprise two adjacent elongated tubular members, each having a top surface and a bottom surface, the top and bottom surfaces facing the belt and having slits therein suitable for blasting cold air onto products carried by the belt.

4. The apparatus of claim 1, wherein the first and second fan means have substantially equal output capacities.

5. The apparatus of claim 1, wherein the means for spirally conveying comprises:

a rotary drum mounted within said casing means for rotation about said axis; and an endless conveyor spirally wound about said rotary drum and rotatable therewith, said conveyor being in the form of plural, vertically spaced convolutions.

6. The apparatus of claim 1, wherein said plurality of conduit means enclose an annular region around said belt means so as to contain cold air within said annular region.

7. A freezer apparatus comprising:

heat insulating casing means;

conveying means for conveying and carrying products which are to be frozen through said casing means;

cold air source means disposed in said casing;

multiple fans means disposed within said casing each having an input and an output, the input of each fan means attached to said cold air source means to draw cold air from the cold air source means and blow cold air through its output;

multiple pressure rooms each connected to the output of a particular fan means;

a plurality of blast nozzles members positioned above and below the belt means at spaced locations along the length of the belt means;

connecting means for connecting each pressure room to a predetermined grouping of blast nozzle members along the length of the belt means so that the blast nozzle members blast cold air from above and below the belt means at substantially equal temperature and volume at the belt means and uniformly along the length of the belt means.

8. The apparatus of claim 7, wherein said cold air source means comprise multiple cooling units, each attached to one fan means.

9. The apparatus of claim 7, wherein said connecting means connects the output of one fan to all of the nozzle members which are above the belt means, and connects the output of another fan to all of the nozzle members which are below the belt means.

10. The apparatus of claim 9, wherein said cold air source means comprises two cooling units, one cooling unit dedicated to blast nozzles above the belt means and the other cooling unit dedicated to blast nozzles below the belt means, and wherein said multiple fan means comprise two fans, the input of each fan connected to one of the cooling units.

11. A method for rapidly freezing products comprising the steps of:

spirally conveying a belt through vertically spaced convolutions inside a heat insulating casing about an axis between an entry to said casing and an exit from said casing;

blowing air from a cold air source disposed in said casing into discrete pressure rooms;

positioning a plurality of blast nozzles in between contiguous convolutions of the belt;

grouping the blast nozzles into groups dedicated to a particular pressure room;

conveying air from each pressure room to each group of blast nozzles for blasting cold air from above and below the belt at substantially equal temperature and volume and uniformly along the length of the belt.

12. The method of claim 11, and further comprising the step of positioning each pressure room at equal distances from its corresponding group of blast nozzles.

13. The method of claim 11, and wherein the step of blowing further comprises the step of providing multiple fans of substantially equal capacities, each fan dedicated to blowing cold air from the cold air source into a particular pressure room.

14. A method for rapidly freezing products comprising the steps of:

conveying products which are to be frozen along a path between an entry to said casing and an exit from said casing;

blowing air from a cold air source disposed in said casing into discrete pressure rooms;

positioning a plurality of blast nozzles above and below the path at spaced positions along the length of the path;

grouping the blast nozzles into groups dedicated to a particular pressure room;

conveying air from each pressure room to each group of blast nozzles for blasting cold air from above and below the path at substantially equal temperature and volume and uniformly along the length of the path.

15. A freezer apparatus comprising:

heat insulating casing means;

means for supporting and conveying products which are to be frozen along a path through said casing means;

cold air source means disposed in said casing;

multiple fans means disposed within said casing each having an input and an output, the input of each fan means being attached to said cold air source means to draw cold air from the cold air source means and blow cold air through its output;

multiple pressure rooms, each connected to the output of a particular fan means;

a plurality of blast nozzles members positioned above and below the path at spaced locations along the length of the path;

connecting means for connecting each pressure room to a predetermined grouping of blast nozzle members along the length of the path so that the blast nozzle members along a first length portion of the path blast colder air than that blasted from blast nozzle members along a second length portion of the path.

16. A method for freezing products comprising the steps of:

conveying products to be frozen through a zone;

blowing cold air at a first cooling capacity in a first portion of the zone;

blowing cold air at a second cooling capacity in a second portion of the zone;

generating cold air at the first cooling capacity by connecting an input of a first fan to a cooling unit to blow air from the cooling unit to blast nozzles positioned in the first portion of the zone, generating cold air at the second cooling capacity by connecting an input of a second fan, having a greater output capacity than the first fan, to the cooling unit, and connecting an output of the second fan to blast nozzles positioned in the second portion of the zone.

* * * * *